United States Patent [19]
Leiber

[11] 4,231,620
[45] Nov. 4, 1980

[54] ANTI-LOCK APPARATUS FOR A HYDRAULIC BRAKE SYSTEM

[75] Inventor: Heinz Leiber, Leimen, Fed. Rep. of Germany

[73] Assignee: Robert Bosch GmbH, Stuttgart, Fed. Rep. of Germany

[21] Appl. No.: 41,144

[22] Filed: May 21, 1979

[30] Foreign Application Priority Data

Jun. 8, 1978 [DE] Fed. Rep. of Germany ....... 2825087

[51] Int. Cl.³ .............................................. B60T 8/02
[52] U.S. Cl. .................................... 303/119; 303/116
[58] Field of Search ................. 303/119, 114, 92, 115, 303/116, 117, 6 R, 118, 6 A; 188/181 A

[56] References Cited

FOREIGN PATENT DOCUMENTS

| | | |
|---|---|---|
| 2344969 | 3/1974 | Fed. Rep. of Germany ........... 303/119 |
| 2401418 | 7/1975 | Fed. Rep. of Germany ........... 303/119 |
| 2531016 | 1/1977 | Fed. Rep. of Germany . |
| 2750491 | 5/1979 | Fed. Rep. of Germany . |

Primary Examiner—Douglas C. Butler
Attorney, Agent, or Firm—Edwin E. Greigg

[57] ABSTRACT

An anti-lock apparatus for a pump-reinforced hydraulic brake system which includes a foot-actuated brake valve and a hydraulic main brake cylinder, the main cylinder being attached to a closed brake circuit so that in the event anti-locking is required, pressure medium is drawn from the closed brake circuit under the control of a 3/2-way valve in order to lower the pressure. This lowering of pressure is monitored via a return line by a switchover valve dependent on reservoir pressure and the withdrawal of this volume takes place by way of a check valve which only opens the passage through the return line when the pressure on the secondary side is higher than that on the primary side. The piston of the main cylinder serves to mechanically control the return flow. The brake valve has a pedal path blocking, which is made effective when the auxiliary energy supply is intact and which becomes ineffective when this supply fails.

5 Claims, 1 Drawing Figure

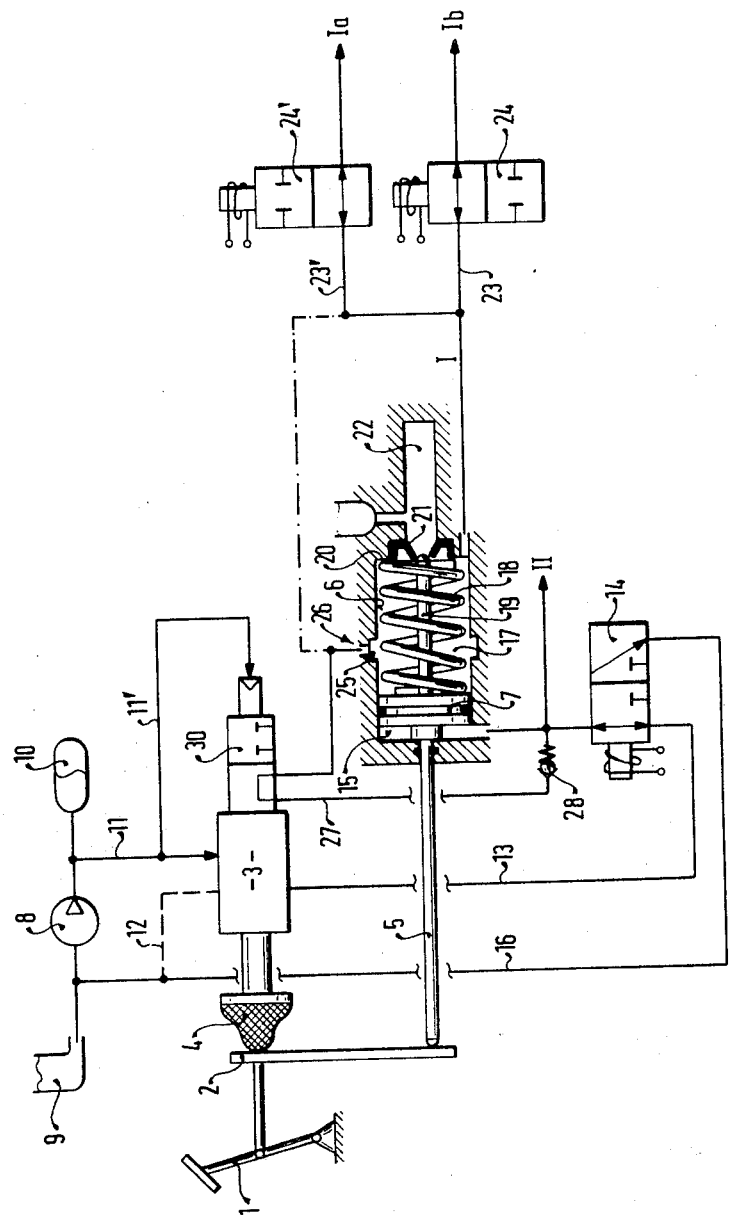

ANTI-LOCK APPARATUS FOR A HYDRAULIC BRAKE SYSTEM

BACKGROUND OF THE INVENTION

The invention relates to an anti-lock apparatus. Such anti-lock apparatus is known from the German Offenlegungsschrift No. 25 31 016 now German Pat. No. DT25 31 016 A1.

In the above-referred to known apparatus, the main brake cylinder piston is employed for the purpose of pressure modulation. Integrated brake force boosters are also already known, which operate with a travel-limiting spring, a brake valve and the appropriate hydraulic energy supply. When the energy supply is intact, the brake pedal push rod can cover an idle path distance which corresponds to the stroke of the path simulator, until it comes into contact with the main brake cylinder piston. In such an apparatus, it is assured, by means of particular features, that when the anti-lock means is operating to reduce the pressure to a low pressure level, the main brake cylinder piston can be driven back into the outset position without being contacted by the brake pedal push rod. If the auxiliary force fails, by means of particular features, the idle path distance noted above between the pedal push rod and the piston is eliminated; the push rod then comes into direct contact with the piston so that immediately upon the pedal's actuation, pressure can build up in the closed brake circuit.

OBJECT AND SUMMARY OF THE INVENTION

The anti-lock apparatus in accordance with the invention has the advantage over the prior art in that it is of substantially more simple construction. Thus, the number of switching valves, auxiliary elements and auxiliary pistons is greatly reduced. Accordingly, the subject of the invention is much less subject to failure. Finally, even if there is a defect in the switchover valve, a residual braking effect at the level of the legally prescribed values is still assured.

The invention will be better understood as well as further objects and advantages thereof become more apparent from the ensuing detailed description of a preferred embodiment taken in conjunction with the drawing.

BRIEF DESCRIPTION OF THE DRAWING

The single FIGURE of the drawing is a schematic diagram of thhe anti-lock apparatus of the invention incorporated in a hydraulic brake system.

DESCRIPTION OF THE PREFERRED EMBODIMENT

As shown in the drawing, the anti-lock apparatus of the invention includes a brake pedal 1 which acts by way of a plate 2 on both a travel-limiting spring 4 located in front of a brake valve 3 and on a push rod 5 of a piston 7 movable within a hydraulic main cylinder 6. The brake valve 3 and the main cylinder 6 are disposed in parallel relationship adjacent each other. A pump 8 furnishing auxiliary force communicates with both a reservoir 9 and with a storage container 10. A pressure line 11 leads from the pump 8 to the brake valve 3 and via a branching line 11' to a switchover valve 30, which is disposed behind the brake valve 3 in coaxial relationship therewith. The switchover valve 30 is a two-position valve, which can be repositioned in a pressuredependent manner by the storage container pressure; that is, when there is storage container pressure available, it is in the position shown which provides line communication, and when the storage container pressure fails, it blocks the line communication.

Leading off from the brake valve 3 are both a relief line 12 communicating with the reservoir 9 and a control line 13 which leads via an electromagnetically actuatable 3/2-way valve 14 to a primary chamber 15 is the main cylinder 6. The valve 14 also communicates, via a relief line 16, with the reservoir 9.

The main cylinder piston 7 defines, within the main cylinder 6, the primary chamber 15 on one side and a secondary chamber 17 on the other side, in which a return spring 18 for the piston 7 and a piston rod 19 are disposed. At the bottom 20 of the secondary chamber 17 there is a ring seal 21, which separates a refill chamber 22 from the secondary chamber 17 whenever the rod 19 protrudes into the ring seal 21. The secondary chamber 17 is attached via two brake lines 23, 23' to brake cylinders (not shown) of a brake circuit I. Inserted into each of the brake lines 23, 23' are 2/2-way valves 24, 24' by means of which the pressure can be blocked off in these brake lines in order to maintain pressure.

A brake circuit II, also closed, having its own main cylinder and 2/2-way valves can be attached to the control line 13. This brake circuit II is then monitored by the 3/2-way valve 14 as well as the pressure-lowering valve.

In the secondary chamber 17 an annular groove 25 is provided which can be overridden by the piston 7. In this manner, a valve 26 is formed which monitors the communication of the secondary chamber 17 with a return flow line 27 which leads back to the primary chamber 15. A check valve 28 is inserted into the return flow line 27 which opens toward the primary chamber 15 whenever the pressure in the secondary chamber 17 is higher than that in the primary chamber 15. The return flow line 27 is monitored by the switchover valve 30 in a manner dependent on the pressure in the storage container 10.

Mode of Operation

When the brakes are actuated, the force transmitted from the brake pedal 1 to the travel-limiting spring 4 is exerted on the brake valve 3 which carries out a transmission of pressure in proportion to the pedal force. The control pressure directed by the brake valve 3 proceeds via the control line 13 to the 3/2-way valve 14 and from there onto the primary chamber 15 of the main brake cylinder piston 7. As a result of this exertion of pressure upon it, the piston 7 moves toward the right, which results in a corresponding increase in pressure in the closed brake circuit I by way of the 2/2-way magnetic valves 24, 24'.

The switchover valve 30 is normally open, that is, whenever there is sufficient storage container pressure. In spite of this, no pressure medium can escape via the annular groove 25 and the return flow line 27 to the check valve 28, because the higher (primary) pressure prevails on the inlet side of the check valve. This is because, as a result of piston friction and the resetting force of the spring 18, the secondary pressure in the main cylinder 6 is lower.

At a normal mutual adjustment of travel-limiting spring 4 and the main cylinder piston 7, the main cylinder piston 7 moves a greater distance than the corresponding path of the travel-limiting spring 4. A mode of operation of this sort is described in the earlier German application P 27 50 491.2 now German Pat. Nos. DE27 50 491 A1 and corresponding to U.S. application Ser. No. 948,264. Now if the travel-limiting spring 4, subjected to full pressure, is fully compressed, and if the vehicle equipped with the anti-lock apparatus is simultaneously operating with a low coefficient of friction, after the 3/2-way valve 14 switches over, the push rod 5 comes into contact with the plate 2, which is connected to the brake pedal 1. Without the annular groove 25 and the additional return flow line 27, the pressure buildup would be limited, which would cause the wheels to lock. However, as a result of the return flow line 27, pressure medium can flow out of the secondary circuit, which causes the desired brake pressure reduction for the anti-lock function.

In order to lower the pressure, the 3/2-way valve 14 is driven into a second position; the pressure medium can flow back into the reservoir 9 by way of the relief line 16. If the pressure in both wheel brake channels I$a$ and I$b$ is to be reduced, then the 2/2-way valves 24, 24' built into the secondary side are not actuated. If instead, however, a pressure buildup is required at only one wheel, then the appropriate 2/2-way valve 24 or 24' switches to a pressure maintenance function by way of the second position.

Under closed-loop control at a low coefficient of friction and with full actuation of the brake valve 3, the piston 7 travels as far as the area of the annular groove 25 which prevents any further reverse effect on the part of the push rod 5 on the plate 2. This means that the antilocking reduction of pressure can take place unhindered by the position of the plate 2.

If the auxiliary energy fails, then the switchover valve 30 switches into its other position, in which it blocks off the return flow line 27. The force of the brake pedal 1 is directed straight onto the piston 7 via the plate 2 and the push rod 5, which then causes a pressure increase in a conventional manner in the closed brake circuit or circuits I and II.

Instead of the annular groove 25, a different valve construction is also possible. In that event, care must be taken that the connection between the secondary chamber 17 and the return flow line 27 is interrupted whenever the piston 7 has penetrated to a certain extent into the secondary chamber 17. Thus, for example, a rod attached to the piston can also mechanically actuate a 2/2-way valve.

The foregoing relates to a preferred embodiment of the invention, it being understood that other embodiments and variants thereof are possible within the spirit and scope of the invention, the latter being defined by the appended claims.

What is claimed and desired to be secured by Letters Patent of the United States is:

1. An anti-lock apparatus for a hydraulic brake system comprising, in combination: a hydraulic main cylinder having a piston, a primary side and a secondary side for supplying a closed brake circuit, a foot-actuated brake valve, a travel-limiting spring operatively associated with said foot-actuated brake valve for permitting the pressure medium from a pressure source to be fed to said hydraulic main cylinder primary side, one 3/2-way valve and at least one 2/2-way valve operatively associated with said main cylinder for the purpose of anti-locking pressure modulation, a control line having said 3/2-way valve inserted therein leading to said primary side of said main cylinder, a return flow line disposed between said main cylinder secondary side and primary side, and a switchover valve dependent on storage container pressure for monitoring the passage of said return flow line.

2. An anti-lock apparatus in accordance with claim 1, wherein a check valve opening toward said main cylinder primary side is inserted into said return flow line.

3. An anti-lock apparatus in accordance with claim 1, including a valve controlled by said main cylinder piston for controlling the flow in said return flow line on said main cylinder secondary side.

4. An anti-lock apparatus in accordance with claim 1, wherein said brake valve and said switchover valve are disposed one behind the other in parallel relationship with said main cylinder and including a push rod, and a brake pedal, said brake valve with the interposition of said travel-limiting spring and said main cylinder being actuatable via said push rod by said brake pedal.

5. An anti-lock apparatus in accordance with claim 4, including means for blocking the pedal motion under full actuation and when the energy supply is intact.

* * * * *